(12) United States Patent
Jeon (10) Patent No.: US 8,780,733 B2
(45) Date of Patent: Jul. 15, 2014

(54) RADIO COMMUNICATION SYSTEM FOR SUPPORTING HYBRID AUTOMATIC REPEAT REQUEST (HARQ) AND DATA TRANSMISSION METHOD

(75) Inventor: Hyung Joon Jeon, Gyeonggi-do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 196 days.

(21) Appl. No.: 12/996,057

(22) PCT Filed: May 28, 2009

(86) PCT No.: PCT/KR2009/002845
§ 371 (c)(1),
(2), (4) Date: Mar. 9, 2011

(87) PCT Pub. No.: WO2009/148234
PCT Pub. Date: Dec. 10, 2009

(65) Prior Publication Data
US 2011/0164507 A1    Jul. 7, 2011

(30) Foreign Application Priority Data

Jun. 3, 2008 (KR) .......................... 10-2008-0052338

(51) Int. Cl.
*H04J 1/16* (2006.01)

(52) U.S. Cl.
USPC ........... 370/242; 370/233; 370/252; 370/248; 370/328; 370/395.4; 455/67.13

(58) Field of Classification Search
USPC .......................................................... 370/242
See application file for complete search history.

(56) References Cited

U.S. PATENT DOCUMENTS

| 2003/0009717 | A1 | 1/2003 | Fukushima et al. | |
| 2009/0285109 | A1* | 11/2009 | Chin et al. | 370/252 |
| 2010/0251058 | A1* | 9/2010 | Chandra et al. | 714/751 |
| 2011/0026408 | A1* | 2/2011 | Skarve et al. | 370/242 |

FOREIGN PATENT DOCUMENTS

| KR | 1020060115200 A | 11/2006 |
| KR | 1020060124379 A | 12/2006 |
| KR | 100717999 B1 | 5/2007 |

* cited by examiner

*Primary Examiner* — Willie J Daniel, Jr.
(74) *Attorney, Agent, or Firm* — Sughrue Mion, PLLC (57) ABSTRACT

Disclosed is a radio communication system and a data transmission method, which facilitates to improve reliability and efficiency of the communication system by the use of HARQ (Hybrid Automatic Repeat Request), wherein the data transmission method using an HARQ method comprises determining a service class in a service flow of a data packet to be transmitted; setting a target PER according to the service class; and determining whether or not the data packet is re-transmitted based on the target PER.

12 Claims, 4 Drawing Sheets

RADIO COMMUNICATION SYSTEM FOR SUPPORTING HYBRID AUTOMATIC REPEAT REQUEST (HARQ) AND DATA TRANSMISSION METHOD

FIELD OF THE INVENTION

The present invention relates to a radio communication system, and more particularly, to a radio communication system capable of improving communication reliability and efficiency by the use of Hybrid Automatic Repeat Request (HARQ) method, and a data transmission method using the above radio communication system.

BACKGROUND OF THE INVENTION

A main communication method is changed from a wire communication to a wireless (radio) communication. Recently, a portable Internet technology has been actively developed to overcome limits of the related art radio communication. This portable Internet technology indicates a service which enables a user to use high-speed Internet without limitation of time and place. That is, the portable Internet technology is a new kind of communication service, which is created by combining advantages of both mobile phone and wireless LAN.

A portable Internet service using a radio communication channel supports high-speed and high-quality data service based on IEEE 802.16 technology standard. Most of causes of hindering the high-speed and high-quality data service in the radio communication result from wireless channel environment. The wireless channel environment may be frequently changed not only by white noise but also by the signal-power change by fading, the shadowing, the Doppler effect by the frequent movement and speed change of portable terminal, and the interference by other users and multi-path signal.

The change of wireless channel environment affects a transmission quality of wireless communication system. For providing high-speed and high-quality radio data packet service under the environment of communication service using the above wireless channel, there has been proposed a method of correcting the packet transmitted, for example, Hybrid Automatic Repeat Request (hereinafter, referred to as 'HARQ') method.

The HARQ method basically tries correcting errors in received codes, and determines whether or not the code is re-transmitted by the use of simple error-detection code such as CRC (Cyclic Redundancy Check).

The transmission quality via the wireless channel may be determined based on the reliability of data received in a receiving unit. The channel reliability may be defined by a packet error rate or frame error rate.

In case of the IEEE 802.16 technology standard, the services may include five kinds of Unsolicited Grant Service (UGS), Real-time Polling Service (rtPS), Extended Real-time Polling Service (ertPS), Non-real-time Polling Service (nrtPS), and Best Effort Service (BE service), on the basis of QoS request in the respective services. Among the above five services, the UGS, ertPS, and rtPS are included in the real-time service; and the nrtPS and BE service are included in the non-real-time service. These services have QoS parameters of minimum transmission rate, maximum latency, jitter, and maximum sustain rate values in traffic.

There are many differences of QoS parameters between the real-time service and the non-real-time service. Among the many differences, especially, the largest difference between the real-time service and the non-real-time service may be referred to as latency. In consideration to latency condition, the traffics of the real-time service have the following properties.

Generally, a real-time traffic has a higher priority than a non-real-time traffic so to satisfy the latency condition.

In case of the real-time service, supposing that the latency condition (latency condition and jitter condition in the UGS and ertPS) is not satisfied in the corresponding packet. In this case, even though the corresponding packet is successively transmitted, the corresponding packet cannot be used. For satisfying these conditions, there is a need for a carefully designed scheduling algorithm for the real-time service.

From the viewpoint of loss packet error rate, the real-time service is less sensitive than the non-real-time service. However, when the HARQ mechanism is designed and implemented, not much consideration is given for this less restrictive requirement for latency in case real-time service is provided. That is, the re-transmission for all erroneous packets is requested even under the favorable condition when the permitted packet error rate (PER) for the real-time service is being satisfied. This causes the undesirable extra latency so that the efficiency of communication system is deteriorated.

DISCLOSURE

Technical Problem

Accordingly, the present invention is directed to a radio communication system providing a communication service, which facilitates to reduce latency.

An aspect of the present invention is to provide a communication system providing a communication service, which facilitates to improve reliability and efficiency of the communication system.

Another aspect of the present invention is to provide a data transmission method which facilitates to improve reliability and efficiency of communication system.

Technical Solution

To achieve these objects and other advantages and in accordance with the purpose of the invention, as embodied and broadly described herein, there is provided a radio communication system receiving and transmitting data by the use of radio communication channel comprising: a receiving unit and transmitting unit for receiving and transmitting a data packet by an HARQ method; a parameter setting unit for determining a service class in a service flow of the data packet, and then setting a target PER according to the service class; and a re-transmission decision unit for detecting whether or not the current PER at the time when the re-transmission of the data packet is requested satisfies the target PER, and then determining whether or not the data packet requested to be re-transmitted is re-transmitted according to the detection result.

In another aspect of the present invention, there is provided a data transmission method using an HARQ method comprising: determining a service class in a service flow of a data packet to be transmitted; setting a target PER according to the service class; and determining whether or not the data packet is re-transmitted based on the target PER.

In another aspect of the present invention, there is provided a data transmission method using a HARQ method comprising: if there is a request for re-transmission of erroneous data packet, detecting whether or not a current PER at the time when the re-transmission of the data packet is requested satisfies a target PER set based on a service class of the data packet; and determining that the re-transmission of the data packet is carried out or rejected based on the detection result.

At this time, the re-transmission of the data packet is rejected if the current PER satisfies the target PER.

Also, the re-transmission of the data packet is carried out within a pre-defined maximum number for re-transmissions, if the current PER does not satisfy the target PER.

Advantageous Effects

In the radio communication system and data transmission method using HARQ method according to the embodiment of the present invention, when the error occurs in the received data packets, it is detected whether or not the current PER satisfies the target PER after observing the pre-determined number of packet units or pre-determined time period, and then the erroneous data packet is selectively re-transmitted according to the detection result, thereby improving reliability and efficiency of communication system.

In the radio communication system and data transmission method using HARQ method according to the embodiment of the present invention, when the error is detected in the received data packets, and the current PER satisfies the target PER, the re-transmission of the data packet is rejected to thereby prevent the unnecessary latency of the data packet. On the other hand, if the current PER does not satisfy the target PER, the re-transmission of the data packet is carried out to thereby improve the reliability of the data transmission.

The data transmission using HARQ of the present invention improves the service quality by decreasing the radio resource consumption and processing latency, and furthermore becomes interoperable with the related art other systems.

MODE FOR INVENTION

Reference will now be made in detail to the preferred embodiments of the present invention, examples of which are illustrated in the accompanying drawings.

Hereinafter, a radio communication system using HARQ method according to the embodiment of the present invention and a data transmission method thereof will be described with reference to the accompanying drawings. Before the explanation for the accompanying drawings, a structure of the radio communication system according to the embodiment of the present invention will be briefly described, and then an operation method in the radio communication system will be described with reference to the accompanying drawings.

The radio communication system using HARQ method according to the embodiment of the present invention comprises a portable subscriber station or mobile station (PSS or MS) which performs input and output functions enabling a user to manage information processing, various functions required for a radio communication service, and various functions based on a radio communication standard; a radio access station (RAS) which is provided between the MS and an access control router (ACR) so as to collect data from the MS, transmit the collected data to the ACR, and allocate the data from the ACR to the respective MSs; the ACR which performs a network for connecting the RAS with a network server or IP network, and performs a router function for transmitting the data between the RAS and the network server or IP network, a mobility managing function, and an account managing function; and the network server (back end system) which performs various authentications and additional services, wherein the network server comprises an authentication system, Lightweight Directory Access Protocol (LDAP), Domain Name Server (DNS), Dynamic Host Configuration Protocol (DHCP), and soft switch.

For a smooth service provision in the radio communication system using HARQ method according to the embodiment of the present invention, if a current packet error rate (PER) satisfies a target PER that is usually pre-defined for each of available service classes, a erroneous data packet is not re-transmitted. Thus, the radio communication system using HARQ method according to the embodiment of the present invention ensures that the service quality is improved and resource consumption is minimized.

If providing the data transmitting-receiving service by real-time or non-real-time under the favorable channel environment (channel environment satisfying that the PER is not more than 1%), the radio communication system using HARQ method according to the embodiment of the present invention employs decision criteria for the re-transmission of erroneous data packet, and performs the selective re-transmission for the erroneous data packet depending on the decision made by the criteria.

Figure 1:
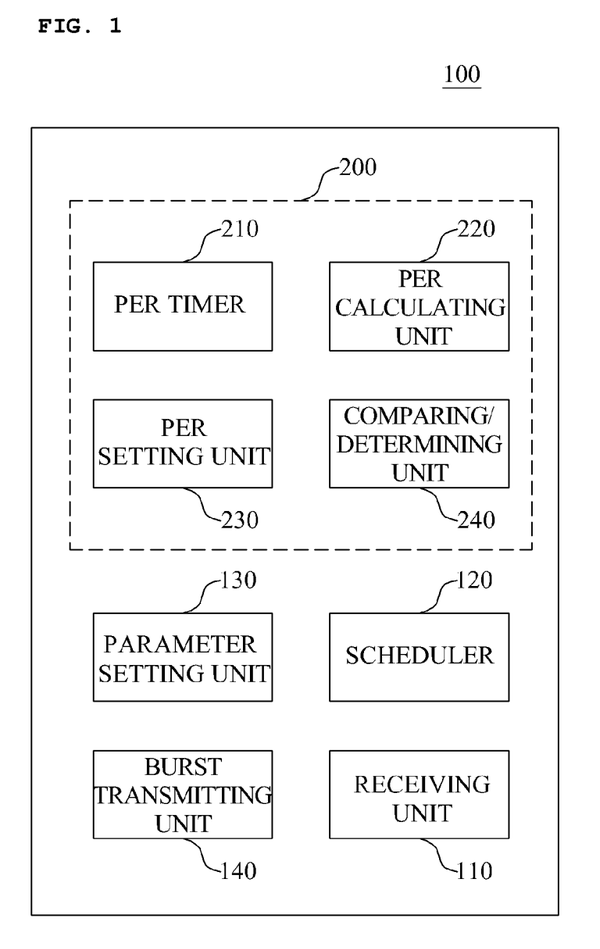
FIG. 1 illustrates a radio communication system supporting HARQ according to the embodiment of the present invention.

For this, as shown in FIG. 1, a re-transmission decision unit 200 is prepared in the RAS 100, wherein the re-transmission decision unit 200 detects the current PER. At this time, the re-transmission decision unit 200 sets the target PER on the basis of the service class; and detects the current PER for the data packets transmitted to a receiving unit or received in the receiving unit during the pre-determined number of packet units or pre-determined time period.

The RAS 100 comprises the receiving unit 110, a scheduler 120, a parameter setting unit 130, and a burst transmitting unit 140.

The receiving unit 110 receives data/control signals from the MS, other RAS's, and the ACR; and then converts the received data/control signals into baseband signals. For example, the receiving unit 110 removes noise from the signal received for the data receiving of the RAS; amplifies the noise-reduced received signal; down-converts the amplified signal into the baseband signal; and digitizes the down-converted baseband signal.

The parameter setting unit 130 sets parameters (SBC, RNG, PMC, UL_MIMO, DL_MIMO, HARQ_MAP) for the communication with the MS.

The scheduler 120 constructs a frame to be transmitted to the MS; and maps a data burst constituting a frame.

Based on results of decision made on the re-transmission in a comparing/determining unit 240, the scheduler 120 maps the data packet to the frame to thereby re-transmit the data packet determined to be re-transmitted.

The burst transmitting unit 140 encodes the data mapped by the scheduler 120, and then transmits the encoded data via an antenna. Herein, the burst transmitting unit 140 comprises a data packet counter (not shown) which counts the number of data packets transmitted.

Then, the re-transmission decision unit 200 comprises a PER timer 210, a PER calculating unit 220, a PER setting unit 230, and the comparing/determining unit 240.

The PER timer 210 is to provide a reference time for calculating the current PER, and a reference time for initializing the pre-determined PER. The PER timer 210 performs a repetitive operation over a pre-defined time period from a start time point; and provides time information about the start time point and end time point to the PER calculating unit 220, and the PER setting unit 230.

The PER calculating unit 220 calculates the PER for the erroneous data packets out of the data transmitted to the MS via the burst transmitting unit 140 by using time information provided from the PER timer 210. The PER calculating unit 220 calculates the current PER by the proportion of the number of erroneous data packets to the total number of data packets transmitted to the MS via the burst transmitting unit 140; and then transmits the calculated current PER to the PER setting unit 230.

The PER setting unit 230 stores the current PER received from the PER calculating unit 220; updates the pre-stored current PER whenever the newly calculated current PER is received; and transmits the updated current PER to the comparing/determining unit 240.

The comparing/determining unit 240 identifies the service class associated with the data packet transmitted; and decides whether the identified service class corresponds to the real-time service or the non-real-time service.

Based on the decision result on the service class, if the erroneous data packet corresponds to the data packet associated with the real-time service, the current PER transmitted from the PER setting unit 230 is compared against the pre-defined target PER; and whether or not the current PER satisfies the target PER is detected. According to the comparison result on the PER, it is decided whether or not the erroneous data packet is re-transmitted, and then the decision result is transmitted to the scheduler 120.

If the erroneous data packet corresponds to the data packet of the non-real-time service, the comparing/determining unit 240 compares the number of re-transmissions done on the underlying packet with the maximum permissible number of re-transmissions. According to the comparison result on the number of executed re-transmissions, the comparing/determining unit 240 decides whether or not the corresponding data packet is re-transmitted; and then transmits the decision result to the scheduler 120.

For the above explanation, the re-transmission decision unit 200 is included in the RAS 100, but it is not limited to this structure. The re-transmission decision unit 200 may be independently provided between the RAS 100 and the MS; or may be included in the MS.

For the above explanation, when the erroneous data packet requested to be re-transmitted corresponds to the real-time service, the re-transmission of the corresponding data packet is determined based on the comparison result between the current PER and the target PER, but it is not limited to this case. Even when the erroneous data packet requested to be re-transmitted corresponds to the non-real-time service, the re-transmission of the corresponding data packet may be determined based on the comparison result between the current PER and the target PER. At this time, if the corresponding data packets requested to be re-transmitted is not sensitive to the latency, the target PER may be set to 0%, whereby the corresponding data packets may be re-transmitted up to the maximum permissible number of re-transmissions.

According to the decision result from the comparing/determining unit 240, HARQ system type I (HARQ Scheme with Chase Combining) or HARQ system type II (HARQ Scheme Incremental Redundancy Scheme) may be applied to the data packet to be re-transmitted. Herein, all methods of HARQ system using the above type I and type II may be applied thereto.

If the error occurs in the data packet transmitted to the MS via the aforementioned structure according to the embodiment of the present invention, it is detected whether or not the current PER satisfies the target PER by the predetermined packet unit every time period or every number of data packets, and then the erroneous data packet is selectively re-transmitted according to the detection result, thereby improving reliability and efficiency of communication system. Depending on the service class, the data packet requested to be re-transmitted is re-transmitted, to thereby improve reliability of communication system. Meanwhile, the re-transmission procedure for the data packet having no request for the re-transmission is omitted so that it is possible to prevent the latency caused by the unnecessary re-transmission, to thereby improve efficiency of communication system.

Figure 2:
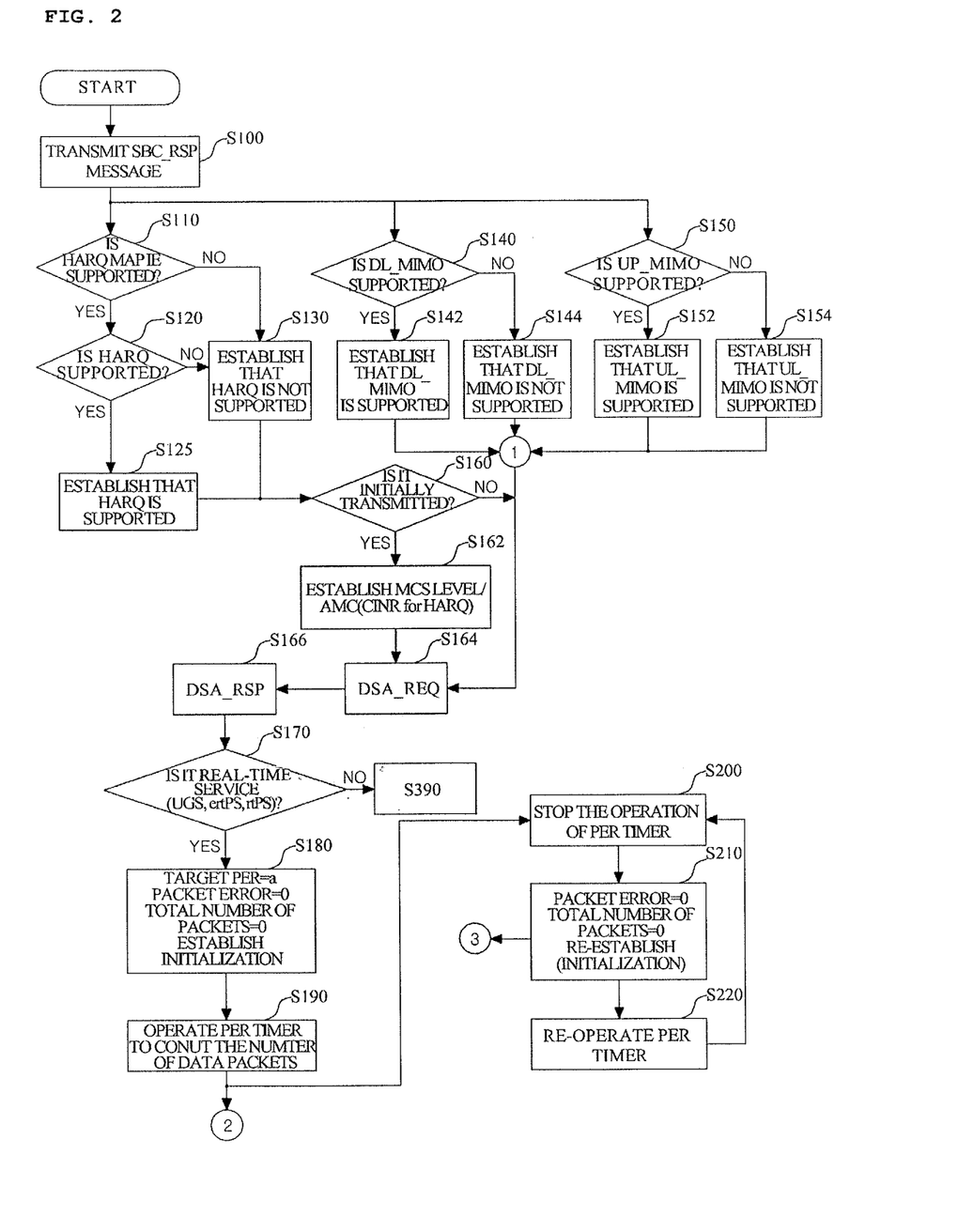
FIGS. 2 to 4 are flow charts illustrating a data transmission method in the radio communication system supporting HARQ according to the embodiment of the present invention.
Figure 3:
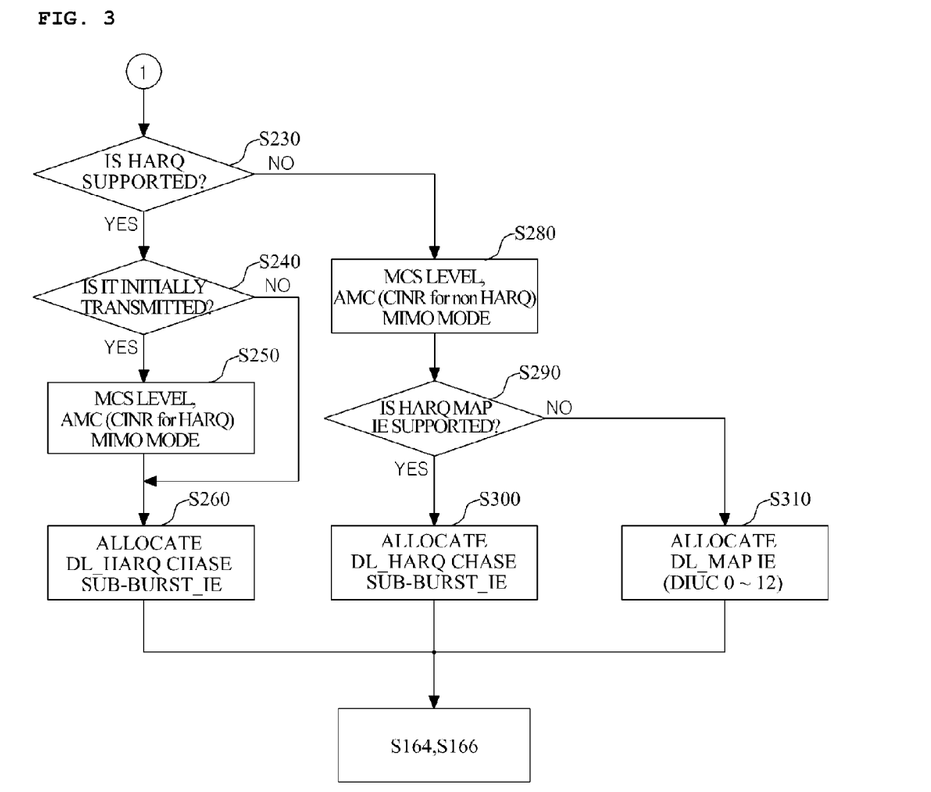
Figure 4:
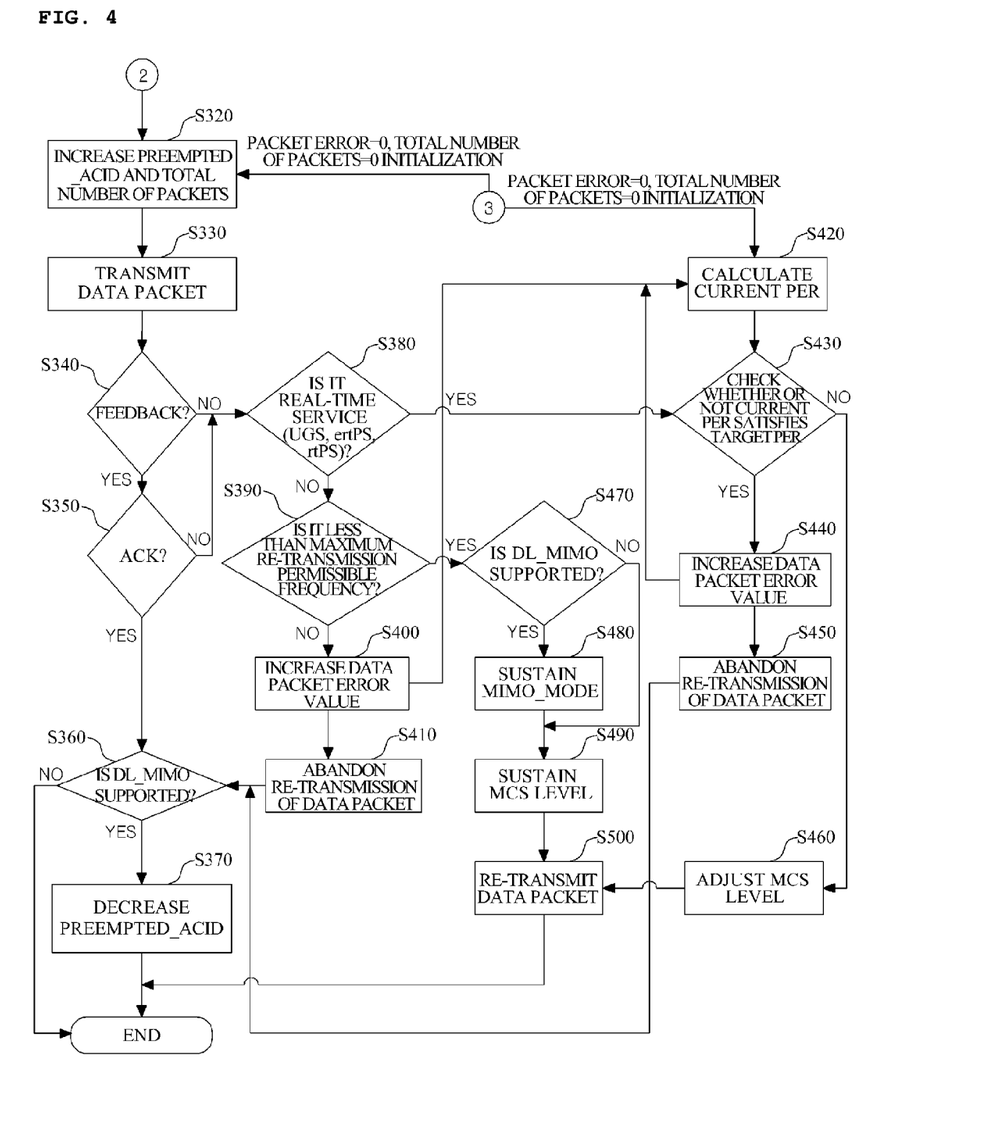

FIGS. 2 to 4 are flow charts illustrating a data transmission method in the radio communication system supporting HARQ according to the embodiment of the present invention. The data transmission method according to the embodiment of the present invention will be described with reference to FIGS. 2 to 4.

Referring to FIG. 2, in order to receive the communication service from the RAS, the MS transmits SBC_REQ message including baseband and modulation information for subscriber station's basic capability negotiation to the RAS; and the RAS transmits SCB_RSP message to the MS in response to the SBC_REQ message (S100).

Through the SBC_REQ/RSP message, it is checked whether or not the MS supports HARQ MAP IE (S110), and whether or not the MS supports DL_MIMO mode and UL_MIMO mode. (S140, S150).

According to the check result of S110, if the MS supports the HARQ MAP IE, it is checked whether or not HARQ is supported (S120). According to the check result of S120, if the MS supports HARQ, the HARQ connection is supported between the RAS and the MS (S125). Meanwhile, if the MS does not support HARQ, the HARQ connection is not supported between the RAS and the MS (S130).

After that, it is checked whether or not the transmitted data packet is initially transmitted (S160). Based on the check result of S160, if the transmitted data packet is initially transmitted, an MCS level is established between the RAS and the MS, and also AMC (establishing CINR to support HARQ) is supported (S162). Then, QoS parameters are established between the RAS and the MS by carrying out the procedure of receiving and transmitting DSA_REQ message and DSA_RSP message between the RAS and the MS every connection and QoS parameter value between the RAS and the MS (S164, S166). In addition to the above procedure of receiving and transmitting the DSA_REQ message and DSA_RSP message by S164 and S166, although not shown in FIG. 2, there may be an additional procedure of receiving and transmitting DSA_ACK message to acknowledge whether or not the above messages are received.

According to the capability check result of DL_MIMO mode in S140, if the MS supports the DL_MIMO mode, the DL_MIMO mode is applied to the data transmission between the RAS and the MS (S142). Meanwhile, if the MS does not support the DL_MIMO mode, the DL_MIMO mode is not applied to the data transmission between the RAS and the MS (S144).

According to the capability check result of UL_MIMO mode in S150, if the MS supports the UL_MIMO mode, the UL_MIMO mode is applied to the data transmission between the RAS and the MS (S152). Meanwhile, if the MS does not support the UL_MIMO mode, the UL_MIMO mode is not applied to the data transmission between the RAS and the MS (S154).

When the data transmission method between the RAS and the MS is determined by the above S140 and S150, as shown in FIG. 3, a procedure of establishing MCS level and allocating burst IE in the corresponding MS is carried out.

Referring to FIG. 3, after determining whether or not the DL_MIMO mode and UL_MIMO mode are supported by the above S140 and S150, it is checked whether or not the MS supports HARQ (S230). According to the check result of S230, if the MS supports HARQ, it is checked whether or not the data transmission is initially transmitted (S240). According to the check result of S240, if the data transmission is initially transmitted, the MCS level is established between the RAS and the MS, and the AMC (establishing CINR to support HARQ) is supported (S250).

After that, DL_HARQ_Chase_Sub-Burst_IE is allocated to support HARQ in the downlink map (S260).

According to the capability result of S230, if the MS does not support HARQ, the MCS level and AMC (CINR) are established (S280). Then, it is checked whether or not HARQ MAP IE is supported (S290). According to the capability result of S290, if the HARQ MAP IE is supported, DL_HARQ_Chase Sub-Burst_IE is allocated (S300). Meanwhile, if the HARQ MAP IE is not supported, the general downlink map (DL_MAP) IE is allocated (S310).

After the above S260, S300 and S310, a procedure of receiving and transmitting DSA_REQ message and DSA_RSP message is carried out to establish the QoS parameter value between the RAS and the MS (S164, S166).

After the above S166, it is detected that the transmitted data packet corresponds to the data packet of the real-time service (UGS, ertPS, rtPS), or the data packet of the non-real-time service (S170). According to the detection result of S170, if the data packet corresponds to the real-time service, the target PER is set (for example, 1%), and the packet error and the total number of packets are initialized (S180).

On progressing the transmission of the data packet, the PER timer 210 is operated so as to count the number of data packets transmitted for the preset time period (S190).

At this time, the PER timer 210 is operated for the pre-defined time period, and is stopped after the lapse of the pre-defined time period (S200). Also, the PER timer 210 transmits time information on starting and stopping its operation to the PER calculating unit 220 and PER setting unit 230.

The PER calculating unit 220 and PER setting unit 230 which both receive the time information from the PER timer 210 may initialize the current PER through the received time information (S210). Also, the time information is transmitted to the burst transmitting unit 140. The burst transmitting unit 140 receiving the time information from the PER timer 210 may initialize the total number of data packets transmitted for the pre-defined time period through the received time information.

After a pre-defined time period, the PER timer 210 re-starts its operation for the pre-defined time period, and is stopped after the lapse of the pre-defined time period (S220). This procedure is carried out repetitively.

According to the detection result from S170, if the transmitted data packet corresponds to the non-real-time service, the target PER may be set to be relatively lower than that of the real-time service (for example, the target PER of the non-real-time service is set to 0%). The procedure will be explained with reference to FIG. 4.

Referring to FIG. 4, if setting the parameters (SBC, RNG, DL_MIMO, UL_MIMO, HARQ, HARQ_MAP, QoS) for the communication through the aforementioned procedure, the total number of data packets transmitted based on the time information provided from the PER timer 210 is initialized (initialized by S210 of FIG. 2).

Then, ACID (Preempted ACID) is increased according to the number of data packets transmitted, whereby the total number of data packets transmitted is also increased (S320). After that, the data packet is encoded according to a pre-defined encoding method, and is then transmitted to the MS (S330).

Then, it is checked whether or not there exits feedback for the transmitted data packet (for example, first data packet) (S340). According to the check result, if there is the feedback for the transmission of the first data packet, it is checked whether or not the feedback corresponds to the acknowledgement ACK (S350).

According to the check result of S350, if the feedback corresponds to the ACK, it is checked whether or not DL_MIMO mode is supported in the corresponding data packet (S360). According to the check result of S360, if the DL_MIMO mode is applied to the data packet in which the ACK is received, the ACID (Preempted ACID) increased by the S320 is decreased (S370). Meanwhile, if the DL_MIMO mode is not applied to the data packet in which the ACK is received, the ACID (Preempted ACID) increased by the S320 is not decreased. Herein, decreasing the preempted ACID indicates decreasing the preempted ACID counting value.

Referring again to above S340 and S350, if there is no feedback for the first data packet from the MS, or if the feedback corresponds to NACK, it is considered that the error occurred in the first data packet transmitted to the MS.

If the error occurs in the data packet transmitted to the MS, the error correction is attempted by re-transmitting the corresponding data packet (if the HARQ service is supported between the RAS and the MS). Whether or not the erroneous data packet is re-transmitted (HARQ) is determined by the following three conditions.

The three conditions are as follows. First, it is checked whether or not the data packet requested to be re-transmitted corresponds to the data packet of the real-time service. Second, when the data packet requested to be re-transmitted does not correspond to the data packet of the real-time service, it is checked whether or not the number of re-transmissions done on the underlying data packet exceeds the maximum permissible number of re-transmissions. Third, when the data packet requested to be re-transmitted corresponds to the data packet of the real-time service, it is checked whether or not the current PER calculated at the time when the error occurs in the data packet satisfies the preset target PER.

According to the aforementioned three conditions, the error-occurred data packet is selectively re-transmitted.

According to the check result of S340 and S350, when it is detected that the error occurs in the data packet transmitted to the MS, it is checked whether or not the erroneous data packet corresponds to the data packet of the real-time service (UGS, ertPS, rtPS) (S380). According to the check result of S380, when the erroneous data packet does not correspond to the data packet of the real-time service, it is checked whether or not the number of re-transmissions done on the underlying data packet exceeds the maximum permissible number of re-transmissions (S390).

According to the check result from S390, when the number of re-transmissions done on the data packet that has been requested to be re-transmitted exceeds the maximum permissible number of re-transmissions, the count value for the number of erroneous data packets is increased (S400). In order to apply the increased error value of the data packet to the following calculation of the current PER in S420, the information about the counter value for the number of erroneous data packets is transmitted to the re-transmission decision unit 200 shown in FIG. 1. After that, the re-transmission of the corresponding data packet is rejected (S410). Then, the procedure following the above S360 is carried out.

Since the error occurred in the corresponding data packet of S410, the corresponding data packet has been already re-transmitted up to the maximum permissible number of re-transmissions. If the re-transmission procedure for this data packet is additionally attempted, it may cause the intolerable level latency on communication service. In this case, it is preferable that the re-transmission of the data packet is abandoned. Although not shown herein, there may be an additional procedure of adjusting the MCS level. This is to reduce the number of the error events in the transmitted data packets due to an inadequate channel state between the RAS and the MS when the data packet is repetitively re-transmitted even after exceeding the maximum permissible number of re-transmissions. The above procedure of adjusting the MCS level may be carried out when the MS receives a request from the RAS, or the RAS receives a request from the MS.

Referring again to above S390, according to the decision result, if the number of re-transmissions done on the corresponding data packet is less than the maximum permissible number of re-transmissions, it is checked whether or not the DL_MIMO mode is applied to the corresponding data packet (S470). According to the check result of S470, if the DL_MIMO mode is applied to the corresponding data packet, the DL_MIMO mode applied to the prior transmission is preserved in the subsequent re-transmissions (S480). Also, the MCS level applied to the prior transmission is preserved (S490), and the re-transmission of the corresponding data packet is carried out (S500). The reason why the DL_MIMO mode and MCS level applied to the prior transmission are sustained is as follows. If the data packet is re-transmitted with the DL_MIMO mode and MCS level applied to the prior transmission changed, it is possible for an MS to correctly decode the received data packet when Chase combining is done in a bit-by-bit fashion. However, it is difficult for an MS to decode the received data packet when chase combining is done in a by a symbol-by-symbol fashion.

Referring again to above S380, if the erroneous data packet corresponds to the data packet of the real-time service (UGS, ertPS, rtPS), it is checked whether or not the current PER calculated at the time when the error occurs in the data packet satisfies the preset target PER, that is, whether or not the current PER is less than the target PER (S430).

The current PER indicates the proportion of erroneous data packets to the total number of data packets transmitted to the MS for the pre-defined time period defined by the operation of the PER timer. Also, the current PER may indicate the proportion of erroneous data packets to the total number of data packets transmitted to the MS for the pre-defined number of packet units. The aforementioned current PER may be initialized every pre-defined time period based on the time information provided from the PER timer. Also, the current PER may be initialized every pre-defined number of packet units.

The target PER is the value previously set during the initial resource negotiation between the RAS and the MS, wherein the target PER indicates the permissible rate of erroneous data packets to maintain the QoS level required for specific QoS service class. The value of the target PER may be arbitrarily set, based on the kind of data packet transmitted and the communication environment (for example, if supporting the real-time service, the target PER may be set to 1%).

The target PER and the current PER are important factors in process of determining rejection of attempting additional re-transmissions on the erroneous data packet, or adjusting the MCS level. In more detail, it is determined whether or not the current PER calculated at the time when the error occurs in the data packet satisfies the preset target PER. Based on the check result, it is determined whether or not the erroneous data packet is re-transmitted, whether or not the re-transmission of the data packet is rejected, or the MCS level is adjusted. The aforementioned target PER may be differently set, regardless of the point in time, according to the kind of data packet and the supported service and communication environment.

Referring again to above S430 to determine whether or the current PER calculated at the time when the error occurs in the data packet satisfies the preset target PER, if the current PER satisfies the target PER according to the check result of S430 (for example, the current PER is not more than 1%), the counter value for the number of erroneous data packets is increased (S440), and then the increased counter value is transmitted to the re-transmission decision unit 200 shown in FIG. 1 (S420) so that the increased counter value is applied to the step of calculating the current PER. After that, the re-transmission of the corresponding data packet is rejected (S450). Then, the procedure following the S360 is carried out.

The reason why the re-transmission of the corresponding data packet is rejected in the above S450 is that the transmission of the corresponding data packet without latency is preferable to the transmission of the corresponding data packet without error, to thereby satisfy QoS in the real-time service.

For preventing the latency in the embodiment of the present invention, wherein the latency should be prevented in order to satisfy QoS of the real-time service, if the current PER satisfies the target PER, the re-transmission of the corresponding data packet is rejected. On assumption that the current PER satisfies the target PER (for example, 1% of the PER), even though some of the erroneous data packet is rejected without further re-transmissions, performance of the data restoration is barely influenced by rejecting the underlying packet.

Referring again to above S430, if the current PER does not satisfy the target PER according to the check result of S430 (for example, the current PER exceeds the target PER preset to 1%), it means that the number of erroneous data packets exceeds the allowable range out of the total data packets transmitted to the MS. In this case, the corresponding data packet is re-transmitted. Before re-transmitting the corresponding data packet, the MCS level is adjusted to prevent the error from occurring in the corresponding data packet (S460). At this time, the MCS level is down-graded by adjustment to thereby improve the immunity against the channel environment.

The MCS level adjustment may be implemented by changing a modulation level (QPSK, 8PSK, 16QAM, and 640QAM) and/or a code rate (½, ¾) associated with a used channel coding mechanism, depending on the change of the channel environment of the downlink. That is, the channel environment is good when the current PER satisfies the target PER for the predetermined time period, whereby the data transmission efficiency can be improved by employing the modulation method and/or code rate with higher spectrum efficiency. Meanwhile, when the channel environment is poor, the immunity against the channel environment can be improved by employing the modulation method and/or code rate with lower spectrum efficiency, to thereby reduce the data packet error rate. After above S460, the re-transmission of the erroneous data packet is carried out (S500).

For the above explanation, if the data packet corresponds to the real-time service, it is checked whether or not the re-transmission of the corresponding data packet is carried out based on whether or not the current PER satisfies the target PER; and it is determined whether or not the re-transmission is carried out according to the check result. However, it is not limited to this embodiment. Like the real-time service, even when the data packet corresponds to the non-real-time service, the aforementioned method of determining whether or not the data packet is re-transmitted based on the current PER and the target PER will be applied.

For the sake of explanation described above, the target PER rate is set to 1%. The target PER rate may be set differently depending on the radio channel environment, the amount of data received and transmitted, and the type of data traffic. For example, if the data packet received and transmitted is very sensitive to the error and latency, the target PER rate may be set to be greater than 1% (for example, PER 2%). Meanwhile, if the data packet received and transmitted is less sensitive to the error and latency, the target PER rate may be set to be smaller than 1% (for example, PER 0%).

The operation time of PER timer and the unit of data packet, which are used for detecting the current PER, may be set differently depending on the radio channel environment, the amount of data received and transmitted, and the type of data traffic.

For the sake of explanation described above, the aforementioned communication method of the present invention is applied under the circumstances that the re-transmission decision unit is provided in the MS and RAS which receive and transmit the data by the use of radio channel. Furthermore, the technical concept of the present invention may be identically applied to a communication system using a wired channel.

In case of the radio communication system and data transmission method using HARQ method according to the embodiment of the present invention, the erroneous data packet requested to be re-transmitted is re-transmitted selectively to thereby improve reliability and efficiency of communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for a transmitting end in a wireless communication system supporting Hybrid Automatic Repeat reQuest (HARQ), the apparatus comprising:
    a communication unit for transmitting a data packet to a mobile station (MS) and receiving feedback for the transmitted data packet;
    a parameter setting unit for determining a service class in a service flow of the data packet, and then setting a target Packet Error Rate (PER) according to the service class, wherein the target PER indicates a permissible rate of erroneous data packets;
    a PER calculation unit for calculating a current PER based on a proportion of a number of erroneous data packets to a total number of data packets transmitted to the MS during a pre-determined number of data packets or a pre-determined time period; and
    a re-transmission decision unit for detecting that the transmitted data packet is erroneous based on the feedback and determining a re-transmission of the data packet when the current PER exceeds the target PER.

2. The apparatus according to claim 1, wherein the re-transmission decision unit determines not to re-transmit the data packet when the current PER does not exceed the target PER.

3. The apparatus according to claim 2, wherein the parameter setting unit sets the target PER of a real-time service is higher than the target PER of a non-real-time service.

4. The apparatus according to claim 3, wherein the parameter setting unit down-grades a Modulation and Coding Scheme (MCS) level regarding the data packet when the current PER exceeds the target PER.

5. A method performed by a transmitting end in a wireless communication system supporting Hybrid Automatic Repeat request (HARQ), the method comprising:
    transmitting a data packet to a mobile station (MS);
    receiving feedback for the transmitted data packet;
    determining a service class in a service flow of the data packet;
    setting a target Packet Error Rate (PER) according to the service class, wherein the target PER indicates a permissible rate of erroneous data packets;
    calculating a current PER based on a proportion of a number of erroneous data packets to a total number of data packets transmitted to the MS during a pre-determined number of data packets or a pre-determined time period;
    detecting that the transmitted data packet is erroneous based on the feedback; and
    determining a re-transmission of the data packet when the current PER exceeds the target PER.

6. The method according to claim 5, further comprising:
    determining not to re-transmit the data packet when the current PER does not exceed the target PER.

7. The method according to claim 6, wherein the target PER the target PER of a real-time service is higher than the target PER of a non-real-time service.

8. A method performed by a transmitting end in a wireless communication system supporting Hybrid Automatic Repeat reQuest (HARQ), the method comprising:
    transmitting a data packet to a mobile station (MS);
    receiving feedback for the transmitted data packet;
    detecting that the transmitted data packet is erroneous based on the feedback;
    setting a target Packet Error Rate (PER) according to a service class, wherein the target PER indicates a permissible rate of erroneous data packets;
    calculating a current PER based on a proportion of a number of erroneous data packets to a total number of data packets transmitted to the MS during a pre-determined number of data packets or a pre-determined time period;
    detecting whether the data packet is about a real-time service or a non-real time service;
    upon a condition in which the data packet is about the real-time service, determining a re-transmission of the data packet when the current PER exceeds the target PER; and
    upon a condition in which the data packet is about the non-real-time service, determining re-transmission of the data packet when a number of re-transmissions done is lower that a pre-determined maximum re-transmission number.

9. The method according to claim 8, further comprising:
    upon a condition in which the data packet is about the real-time service, determining not to re-transmit the data packet when the current PER does not exceed the target PER.

10. The method according to claim 9, further comprising:
controlling that the re-transmission of the data packet of the real-time service to use a down-graded Modulation and Coding Scheme (MCS) level.

11. The method according to claim 8, further comprising:
checking whether or not a downlink (DL) multiple input multiple output (MIMO) mode is applied to the data packet of the non-real-time service; and upon a condition in which the data packet is about the non-real-time service and the DL MIMO is applied to the data packet, keeping a Modulation and Coding Scheme (MCS) level applied to the transmission of the data packet to the re-transmission of the data packet.

12. The method according to claim 11, further comprising:
upon a condition in which the data packet is about the non-real-time service, determining not to re-transmit the data packet when the number of re-transmissions reaches the pre-determined maximum re-transmission number.

* * * * *